United States Patent
Linnartz

(10) Patent No.: US 9,692,526 B2
(45) Date of Patent: Jun. 27, 2017

(54) BODY COUPLED COMMUNICATION DEVICES AND SYSTEMS AS WELL AS A DESIGN TOOL AND METHOD FOR DESIGNING THE SAME

(71) Applicant: KONINKLIJKE PHILIPS N.V., Eindhoven (NL)

(72) Inventor: Johan-Paul Marie Gerard Linnartz, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/021,737

(22) PCT Filed: Sep. 10, 2014

(86) PCT No.: PCT/EP2014/069237
§ 371 (c)(1),
(2) Date: Mar. 14, 2016

(87) PCT Pub. No.: WO2015/039932
PCT Pub. Date: Mar. 26, 2015

(65) Prior Publication Data
US 2016/0233967 A1  Aug. 11, 2016

(30) Foreign Application Priority Data
Sep. 20, 2013 (EP) .................... 13185345

(51) Int. Cl.
*H04B 1/38* (2015.01)
*H04B 13/00* (2006.01)
*H04B 1/3827* (2015.01)

(52) U.S. Cl.
CPC ........... *H04B 13/005* (2013.01); *H04B 1/385* (2013.01)

(58) Field of Classification Search
None
See application file for complete search history.

(56) References Cited

U.S. PATENT DOCUMENTS

| | | | |
|---|---|---|---|
| 6,275,681 B1 * | 8/2001 | Vega | G06K 7/0008 455/41.1 |
| 6,336,031 B1 * | 1/2002 | Schyndel | H04B 13/00 340/870.37 |
| 2006/0077616 A1 * | 4/2006 | Takiguchi | A61L 15/60 361/231 |
| 2006/0252371 A1 | 11/2006 | Yanagida | |

(Continued)

FOREIGN PATENT DOCUMENTS

EP  1598965 A1  11/2005

OTHER PUBLICATIONS

Fujii K et al., "Electric Field Distributions of Wearable Devices Using the Human Body as a Transmission Channel", IEEE Transactions on Antennas and Propagation, IEEE Service Center, Piscataway, NJ, US, vol. 55, No. 7, Jul. 1, 2007 (Jul. 1, 2007), pp. 2080-2087, XP011187036.

(Continued)

*Primary Examiner* — Lana N Le
(74) *Attorney, Agent, or Firm* — Larry Liberchuk

(57) ABSTRACT

Based on new insights in body coupled communication systems, herein a design tool for designing a body coupled communication apparatus, and products for use in body coupled communication systems are provided herein.

11 Claims, 7 Drawing Sheets

(56) References Cited

U.S. PATENT DOCUMENTS

| | | | |
|---|---|---|---|
| 2010/0315206 A1 | 12/2010 | Schenk | |
| 2011/0086595 A1* | 4/2011 | Shibata | H04B 13/005 455/73 |
| 2013/0222185 A1 | 8/2013 | Ben Hamida | |
| 2013/0225200 A1 | 8/2013 | Ben Hamida et al. | |

OTHER PUBLICATIONS

Nozomi Haga et al., "Equivalent Circuit of Intra-Body Communication Channels Based on a Lossy Conductor Model", Antennas and Propagation (ISAP), 2012 International Symposium on, IEEE, Oct. 29, 2012 (Oct. 29, 2012), pp. 672-675, XP032292937.

Haga et al., "Proper Derivation of Equivalent-Circuit Expressions of Intra-Body Communication Channels Using Duasi-Static Field", IEICE Trans. Communnication, vol. E95-B, No. 1, Jan. 2012.

Schenk T. et al., "Experimental Characterization of the Body-Coupled Communications Channel", IEEE ISWCS, pp. 233-239, Oct. 2008.

Cho N. et al., "The Human Body Characteristics as a Signal Transmission Medium for Intrabody Communication", IEE Transactions on Microwave Theory and Techniques, vol. 55, No. 5, pp. 1080-1086, May 2007.

Song S.J. et al., "A 0.9V 2.6mW Body-Coupled Scalable PHY Transceiver for Body Sensor Applications," ISSCC Digest of Technical Papers, IEEE International, pp. 366-609, Feb. 2007.

Mazloum N.S., "Body-Coupled Communications Experimental Characterization, Channel Modeling and Physical Layer Design", Master Thesis, Chalmers University of Technology Philips Research,Department of Signals and Systems Distributed Sensor Systems, Dec. 2008.

Jonassen N., "Human Body Capacitance: Static or Dynamic Concept?", Electrical Overstress/Electrostatic Discharge Symposium Proceedings, 1998 pp. 111-117, Oct. 6, 1998-Oct. 8, 1998, Reno, NV , USA.

Nozomi Haga, Kazuyuki Saito, Masaharu Takahashi, and Koichi Ito. Proper Derivation of Equivalent-Circuit Expressions of Intra-Body Communication Channels Using Quasi-Static Field. IEICE Tr. on Comm., E95B(1):51-59, Jan. 2012.

Ruiz J.A. et al., "Statistical Modeling of Intra-body Propagation Channel", IEEE Communications Society Subject matter experts for publication in the WCNC 2007 proceedings, pp. 2065-2070.

Xu R. et al., "Equation Environment Coupling and Interference on the Electric-Field Intrabody Communication channel", IEEE Transactions on Biomedical Engineering, vol. 59, No. 7, pp. 2051-2059, Jul. 2012.

Cho N. et al., "A 60kb/s-to-10Mb/s 0.37nJ/b Adaptive-Frequency-Hopping Transceiver for Body-Area Network", 2008 IEEE International Solid-State Circuits Conference—Digest of Technical Papers, pp. 132-133, Feb. 2008.

Fujii et al., "Electric Field Distributions Generated by a Wearable Device Using Simplified Whole Human Body Models", Information and Media Technologies, 4 (2): 647-654, 2009, The Journal of The Institute of Image Information and Television Engineers, 62 (12: 1980-1987, 2008.

Kariyannavar et al., "Connecting the Human Body-Models, Connections and Competition", Avdelning, Department Division of Electronics Systems, Department of Electrical Engineering, Aug. 2011.

* cited by examiner

FIG. 9
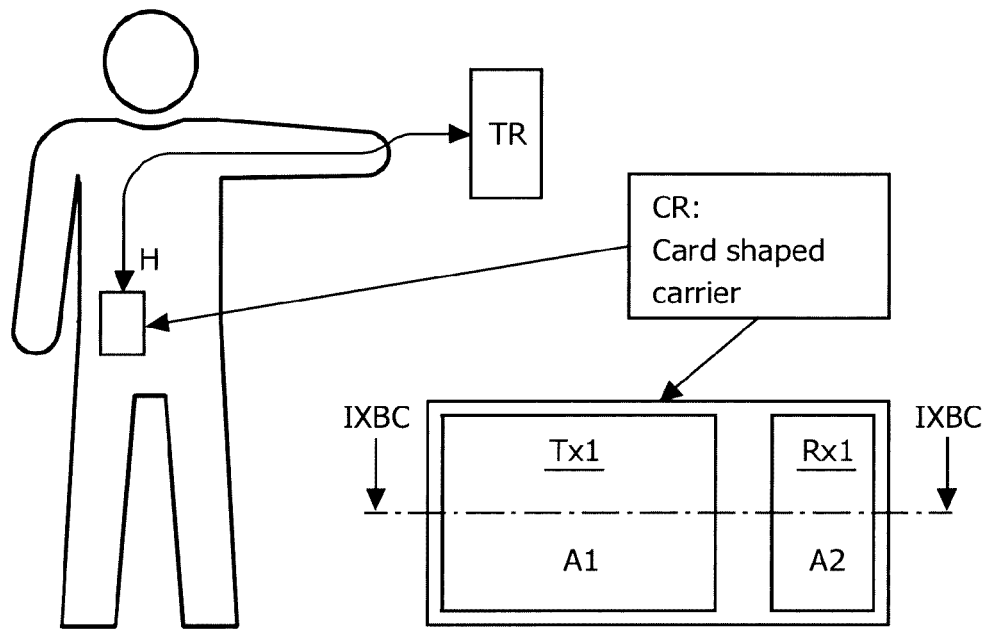
FIG. 9A
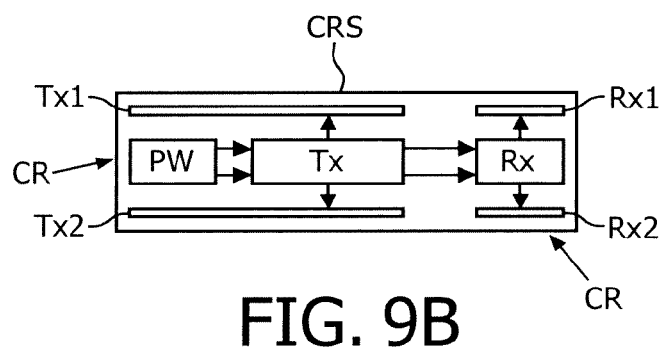
FIG. 9B
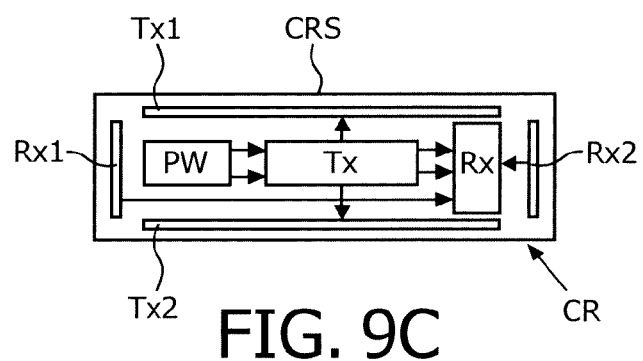
FIG. 9C

BODY COUPLED COMMUNICATION DEVICES AND SYSTEMS AS WELL AS A DESIGN TOOL AND METHOD FOR DESIGNING THE SAME

FIELD OF THE INVENTION

The present invention relates to a body coupled communication device. The present invention further relates to a body coupled communication system using such devices.

The present invention still further relates to a design tool for designing body coupled communication systems and devices.

The present invention also relates to a design method for designing body coupled communication systems and devices.

DESCRIPTION OF RELATED ART

Body Coupled Communication (BCC) is seen as an attractive solution for short-range communication near or on the human body. In Body Coupled Communication systems the human body is an essential carrier of the signals to be communicated. The advantage over radio communication is that the signals stay in close vicinity of the human body. Due to its short communication range this technology is particularly suitable for systems requiring a high security level, such as Body Sensor Networks or for human interaction with electronic authentication such as in mobile payments, access to buildings, passing gates in public transport, etc. It is a further advantage that interference with other systems is mitigated and that typically less power is required than for other wireless technologies, such as Bluetooth.

In order to efficiently and reliably design BCC devices and systems a model is required that concisely yet accurately defines the BCC channel.

Traditional radio communication technology employs many useful simplifications exist to describe the path loss between a transmit and receive antenna. Such expressions are frequently used to estimate coverage ranges of devices, to estimate the transmit power of broadcast transmitters or to calculate link budgets and fade margins. Usually such models only use a limited set of parameters (range, antenna height, the category of urban or rural terrain) but nonetheless reach reasonable accuracy. Examples are the "20 log d" model for free space loss, "40 log d" for Egli's plane earth loss, the 6 dB/oct antenna height gain etc.

Modeling the BCC channel recently received an increasing amount of attention. An extensive investigation in the field of BCC is provided by Haga et al. in "Proper Derivation of Equivalent-Circuit Expressions of Intra-Body Communication Channels Using Quasi-Static Field" published in TRANS. COMMUN., VOL. E95-B, NO. 1 JANUARY 2012.

Yet, despite these recent efforts for body coupled communication, rules of thumb like those that are familiar in traditional radio communication technology are not yet available. This complicates design of body coupled communication devices and of body coupled communication systems including such devices.

FUJII K ET AL: "Electric Field Distributions of Wearable Devices Using the Human Body as a Transmission Channel" IEEE TRANSACTIONS ON ANTENNAS AND PROPAGATION, IEEE SERVICE CENTER, PISCATAWAY, N.J., US, vol. 55, no. 7, 1 Jul. 2007 (2007-07-01), pages 2080-2087, XP011187036, ISSN: 0018-926X, DOI: 10.1109/TAP.2007.900226 proposes calculation models of the human body equipped with wearable devices by using a finite difference time domain (FDTD) method. Moreover, a biological tissue-equivalent solid phantom is utilized to show the validity of the calculation. From these investigations, the transmission mechanism of the wearable devices using the human body as a transmission channel is determined.

US20100315206 relates to a coupler device, processing apparatus that uses an electrode arrangement with a plurality of electrodes or electrode segment. Respective transmission parameters of the body-coupled communication signals are estimated and at least one of a selecting and weighting processing is applied to the detected body-coupled communication signals received from the electrodes or segments thereof, based on the estimated transmission parameters. Then, the processed body-coupled communication signals are combined to generate a diversity output signal. Thereby, robustness against coupler misplacement and user convenience is increased in body-coupled or body-based communication systems. FIG. 2B therein shows a structure connected to the body that consists of two isolated coupling electrodes, where one has to be directed towards the body and the other one is stacked parallel to it.

SUMMARY OF THE INVENTION

It is an object of the present invention to provide improved body coupled communication devices and body coupled communication systems using such devices.

It is a further object of the present invention to provide a design tool for designing body coupled communication systems using an improved body coupled communication model.

It is a still further object of the present invention to provide a design method using the improved body coupled communication model for designing body coupled communication systems.

The various aspects of the present invention are based on an improved body coupled communication model that resulted from new insights in the essential components of the body coupled communication channel.

A carrier frequency for BCC may be in the range of 1 to 150 MHz. Nevertheless selection of the carrier frequency from a more restricted range may be considered. On the one hand it is attractive to select a relatively high carrier frequency, e.g. higher than 3 MHz because higher carrier frequencies typically allow wider modulation bandwidth, which increases capacity. To avoid interference by environmental electromagnetic radiation noise it is desirable to use a carrier frequency higher than 5 MHz. This avoids the necessity of a high transmission power to dominate environmental electromagnetic radiation noise or needing a very redundant channel coding to reliably retrieve the data from the signal transmitted via the channel. Although signals having carrier frequencies above 15 MHz or even above 50 MHz still are suitable for transmission via the body coupled communication channel, their wavelength approaches the order of magnitude of human body dimensions. Therewith the side effect occurs that the human body involved in the channel acts as a transmitter itself. Therewith the signal transmitted via the body coupled communication channel also is transmitted in a wider range. Accordingly for applications wherein the transmission of the signal should be restricted to a receiver arranged close to the human body a carrier frequency lower than about 50 MHz, e.g. lower than about 15 MHz may be selected. It is noted that the carrier frequency does not necessarily have a fixed value as in an amplitude modulated transmission channel. For example a frequency modulated transmission channel may be used wherein the frequency is modulated in a range between 9 and 11 Mhz.

The design tool according to the third aspect and the design method according to the fourth aspect use a two-stage computation model, wherein first a capacitive transfer model from said signal source (Tx), via the human body (H) to the signal receiver (Rx) is determined, and wherein subsequently a performance is calculated on the basis of said capacitive transfer model.

According to one approach the capacitive transfer model for the body coupled communication apparatus comprises a first capacitive Wheatstone bridge representing the transmitter, second capacitive Wheatstone bridge representing the receiver, and further comprises an additional capacitance representing a capacitive coupling between the human body and earth and a capacitance representing a capacitive coupling between the receiver plates and capacities of the capacitive elements are approximated by the following equation $$C_i = C_i^* + C_0 = \frac{\pi \epsilon_0 a^2}{d} + \epsilon_0 \alpha a$$

Therein the first term ($C_i^*$) is a short-range contribution related to the mutual capacitance. The second term ($C_o$) is a long-range contribution related to the self-capacitance. Further, $\epsilon_0$ is the electrical permittivity ($8.85 \times 10^{-12}$ F/m), wherein a and d respectively are a representative dimension of the capacitively coupled elements and a representative distance between the capacitively coupled elements, and wherein $\alpha$ is a form factor depending on the shape of the capacitively coupled elements. For example, a circular disk, a rectangular disk and a sphere respectively have a form factor of $\pi$, 4 and $4\pi$.

The representative dimension a is equal to $$a = \sqrt{\frac{A}{\pi}},$$

wherein A is a characteristic surface area of the capacitively coupled elements. In case the capacitively coupled elements have a mutually different surface area, the characteristic surface area is the smaller one of the surface areas of the elements. In case the capacitively coupled elements area circular plates the representative dimension a is the diameter of the plates. The representative distance d may be selected as the shortest distance between the capacitively coupled elements. In this way a concise model is obtained that despites the simplifications therein is capable of reliably predicting performance of apparatus to be designed.

If nevertheless an even more accurate prediction is required, for example as a final stage of the design process, another approach may be applied. Therein a finite element is used to achieve a more detailed model of the body coupled communication channel. Details are presented in part VII of the description of embodiments.

According to a particular embodiment, a capacitance matrix representative for the capacitive transfer model as obtained with the finite element is inverted. Subsequently the inverted capacitance matrix is used to determine expected attenuation of the transmission signal, and/or other associated performance measures, such as a path loss, a link budget and a bit error rate. See also part VII.

The approaches described above presumes that the user supplies the parameters defining the body coupled communication channel and that the design tool/method is used to predict the performance. Alternatively, the user may specify parameters of a first type for a propagation environment for the signal to be transmitted from the transmitter to the receiver, as well as requirements for the performance. In that case the design tool and the design method can be used to determine the values for the remaining parameters that are required to achieve the desired performance.

Based on the improved modeling technology as described above, various useful improved body coupled communication apparatuses and devices were designed.

Using the new insights obtained with the improved modeling technology it was found that a good performance at a modest power consumption means is obtained in an embodiment having a pair of mutually opposed transmitter plates with a first area A1 and a first mutual distance D1, a pair of mutually opposed receiver plates, with a second area (A2) and a second mutual distance D2, wherein a ratio (A1*D2)/(A2*D1) is at least 2.

In a particular implementation thereof, the receiver and the transmitter are integrated in a carrier to be carried by a human carrier and having lateral dimensions less than about 10 cm and a thickness of less than 15 mm (e.g. a telephone) or even less than 2 mm (e.g. a credit card).

In an embodiment, the pair of mutually opposed transmitter plates is aligned with the carrier surface and the pair of mutually opposed receiver plates is arranged transverse to the main surface at mutually opposite ends of the carrier (CR). In this way the available space in the carrier is optimally used to obtain a suitable ratio (A1*D2)/(A2*D1). Typically the transmitter, the receiver and the power supply are arranged between the transmitter plates and the receiver plates.

In a receiver module for a body coupled communication apparatus one of the receiver plates is coupled via a controllable switching element to ground. Using the controllable switching element, the detection range of the receiver can be controlled. In a closed state of the switch, wherein the one of the receiver plate is coupled to ground, the detection range is relatively large. In an opened state of the switch, wherein the one of the receiver plate is decoupled from ground, like the other one of the receiver plates, the detection range is relatively small.

In a receiver module for a body coupled communication apparatus at least one of the receiver plates is coupled via a controllable capacitive element to ground. The controllable capacitive element can be tuned such that the total capacitive coupling between that one receiver plate and ground equals the capacitive coupling between the other one of the receiver plates and ground. In that case the receiver is optimally desensitized for long-range signals. The controllable capacitive element can be coupled to the one of the receiver plates having the lowest parasitic capacitance to ground and its capacitive value may be controllable between 0 and twice the absolute value of the difference between the capacitances to ground for receiver plates. If it is not beforehand clear which of the receiver plates has the highest capacitance to ground, each of the receiver plates may be coupled via a respective controllable capacitive element to ground. The optimal value for the controllable capacitive element may be tuned by transmitting a signal at a position remote from the receiver and tuning the controllable capacitive element to a value for which the received signal is minimized.

BRIEF DESCRIPTION OF THE DRAWINGS

These and other aspects are described in more detail with reference to the drawing. Therein:

FIGS. 9, 9A and 9B show a second embodiment of a body coupled communication apparatus according to the third aspect of the invention, FIG. 9C (in conjunction with FIGS. 9 and 9A) shows a third embodiment of a body coupled communication apparatus according to the third aspect of the invention.

DETAILED DESCRIPTION OF EMBODIMENTS

Like reference symbols in the various drawings indicate like elements unless otherwise indicated.

In Body-Coupled Communication, a signal propagates as an Electric Field around the human body. It can be generated and picked-up by a capacitive transducer near the skin. Approximate expressions for the path loss in such channels are proposed and compared with more accurate calculations of an equivalent circuit. In particular, the authentication use case is addressed of a transmit tag in the immediate vicinity of the body, e.g. in a wallet, and a reader tag at some distance from the human, e.g. a hand reaching out.

I. Introduction

Figure 1:
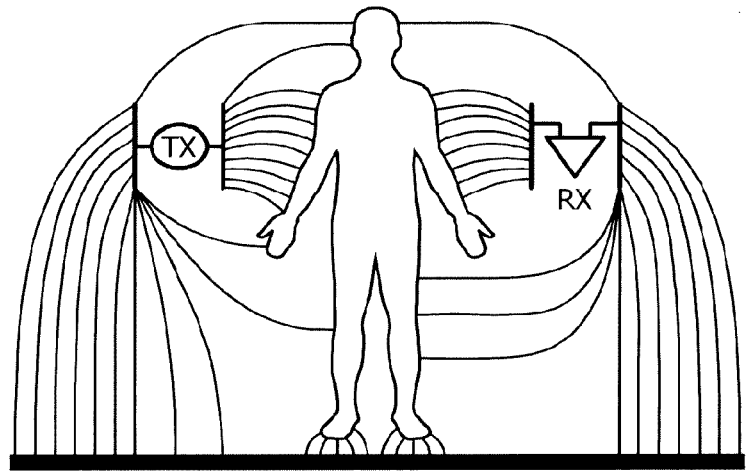
FIG. 1 shows an artist impression of a body coupled communication channel.

Body Coupled Communication (BCC), see the artist impression of FIG. 1, is seen as an attractive solution for short-range communication near or on the human body. It is particularly suited for Body Sensor Networks or for human interaction and authentication, such as in mobile payments, access to buildings, or passing gates in public transport. The advantage over radio communication is that the signals stay in close vicinity of the human body.

Figure 1A:
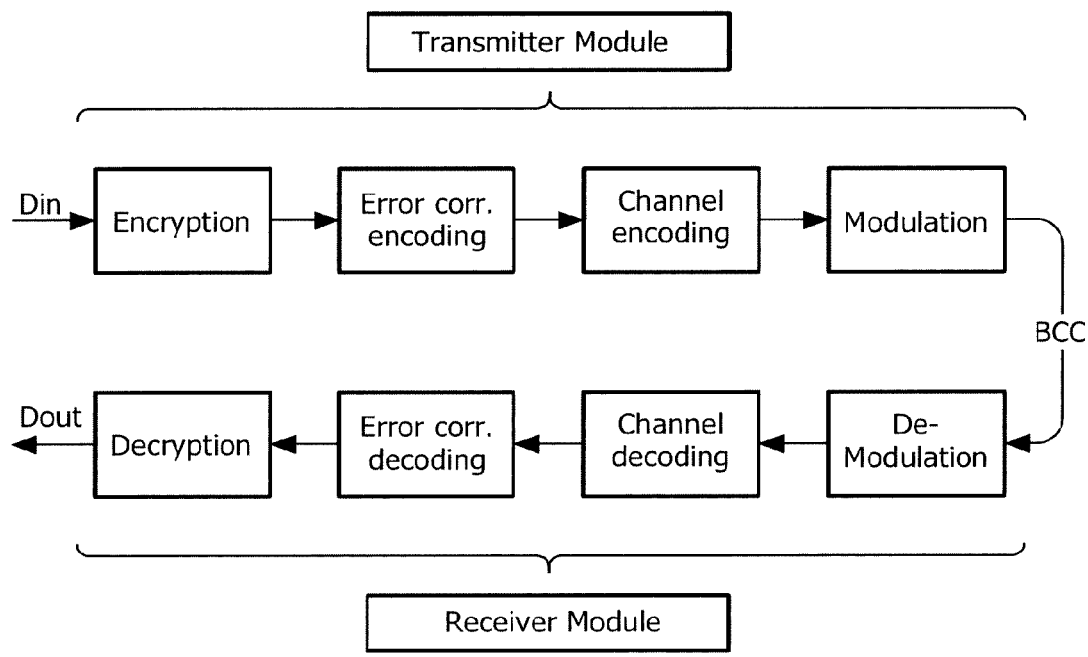
FIG. 1A shows a body coupled communication system including various data processing stages.

FIG. 1A schematically shows a system wherein a body coupled communication data transmission path may be used. Depending on security requirements an encryption module may be present to encrypt data Din to be transmitted. The optionally encrypted data may be encoded according to an error correction encoding (e.g. Reed-Solomon) to optimize reliability of data transfer. Subsequently the channel encoding may be applied to optimally adapt the signal to be transmitted to characteristics of the BCC-channel. Subsequently a carrier signal is modulated with a signal representing the input data, optionally being submitted to one or more of these encryption, error correction encoding and channel encoding steps and transmitted via the body coupled communication channel. Subsequently the receiver module demodulates the signal transmitted by the transmitter module via the human body and if necessary applies channel decoding, an error correction decoding and a decryption.

Modeling the BCC channel recently received an increasing amount of attention. Nonetheless it is still less mature than the modeling of radio wave propagation. Already in the early days of mobile communication, it was known that radio wave propagation is highly affected by objects in the environment which leads to multipath and shadowing. Nonetheless many useful simplifications exist to describe the path loss between a transmit and receive antenna. Such expressions are frequently used to estimate coverage ranges of devices, to estimate the transmit power of broadcast transmitters or to calculate link budgets and fade margins. Usually such models only use a limited set of parameters (range, antenna height, the category of urban or rural terrain, but nonetheless reach reasonable accuracy. Examples are the "20 log d" model for free space loss, "40 log d" for Egli's plane earth loss, the 6 dB/oct antenna height gain etc. Most of these models are based on simplifications of more precise, but numerically not very attractive models.

Yet for body coupled communication such rules of thumb are not yet available. The present invention is based on a thorough analysis of the case of body coupled communications and intends to make realistic assumptions and simplifications of the model.

Aim is to propose and validate a tractable model for the BCC propagation channel that improves the intuitive understanding of the performance of such systems. To this end path loss calculations obtained from a 1) full evaluation of the equivalent circuits, from 2) an interpretation of the circuit as two independent Wheatstone bridges and from 3) asymptotic expressions proposed herein are compared. Moreover several sections compare the results with other interpretations and alternative models.

II. Capacitance Model

A specific case is modeled inspired by the following "authentication" scenario: a transmit tag is carried in the wallet of the user and the user reaches out to a reader. This reader is not grounded, but has two floating capacitive plates.

A. Body Model

The human body is often modeled as a well-conducting capacitance $C_b$, to ground. The inner body is reasonably well conducting, with 100 to 1000 Ohms. For frequencies around 10 MHz relevant to BCC, we see this as a conducting mass. Yet the skin typically has much higher resistances, up to several hundreds of kOhms. In BCC, the skin typically is seen as a capacitance between transducer tags and the conducting inner body. Capacitance of the body itself w.r.t. ground empirically been measured to be around $C_b$=100 pF to 400 pF, so it is large compared to the extra loading capacitances caused by the tag or by the reader.

B. Tag Model

The textbook formula for the capacitance between two circular plates of radius a($A=pa^2$) and distance d is $C=pe_0a^2/d$. This is derived by assuming a uniform field between the plates and negligible field outside this area. This is commonly accepted for d<<a. To model the capacity between the plates at a larger distance this approximation in no longer valid. For larger distances, the field is not necessarily only confined to the area covered by the plates and it is no longer uniform.

Figure 2:
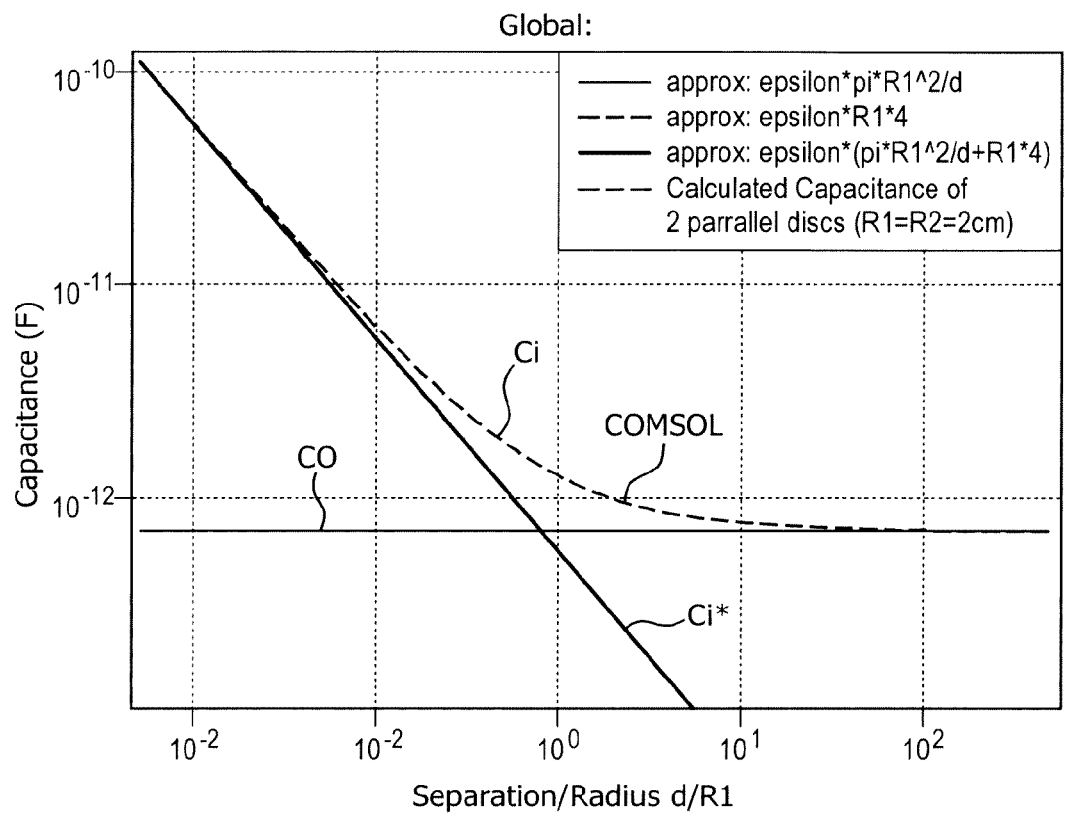
FIG. 2 shows results of various approaches to compute a capacitive coupling.

For the capacity between two conducting objects in free space at large distance (d>>a), the capacitance converges to $C_0 = a\epsilon_0 a$. Here a (alpha) is the geometry constant and depends on the shape of the object, e.g. $a=2\pi$ for a sphere and $a=4$ for a circular plate. In the derivation, the field distribution as it is built near a single plate is taken as the leading mechanism for capacitance. Results of COMSOL calculation are shown as a double-logarithmic graph in FIG. 2. Therein the horizontal axis indicates the ratio between the separation of the plates d and the radius (R1=a/2) of the plates for a fixed value of the radius R1. The vertical axis shows the capacitance (F). FIG. 2 illustrates that for short, large and intermediate distances, a very accurate approximation is the following two-term formula.

$$C_i = C_i^* + C_0 = \frac{\pi\epsilon_0 a^2}{d} + \epsilon_0 \alpha a \quad (1)$$

In FIG. 2 the horizontal line represents the term C0. The slanted asymptote is the approximation Ci*. The mutually overlapping lines are the above-mentioned two term approximation (1) and the COMSOL calculation. From their overlapping it becomes clear that the above-mentioned two term approximation is indeed very accurate particularly for a<<d, a=d and a>>d. Yet a minor, barely visible deviation occurs near a=2 d and a=d/2.

In fact the self-capacitance contributes to the interaction between two plates, particularly when only the two plates constitute to entire environment. The effect of $C_0$ is particularly relevant to model the impedance to ground of a floating tag plate that sees a E-field from another object, such as a the body. In some, but not all equations the effect of the constant term $C_0$ mathematically cancels because of the symmetric (balanced, non-grounded) operation of the transmit and receive tag.

III. Three Stage Approximation

Figure 3:
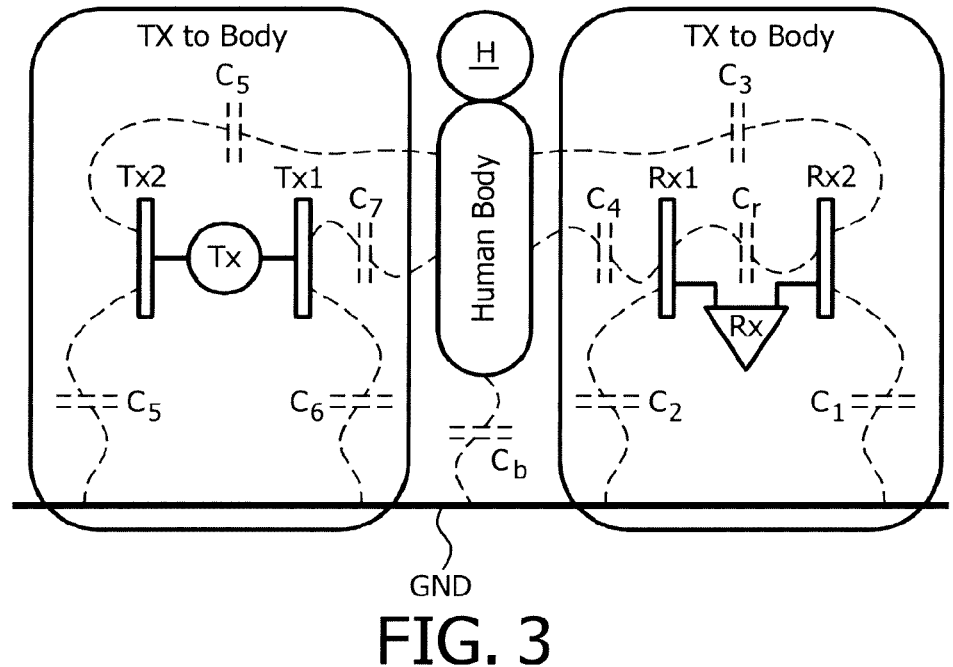
FIG. 3 shows an equivalent circuit model for a body coupled communication channel.

A body coupled communication apparatus as shown in FIG. 3, typically comprises a transmitter source (Tx) to generate a transmission signal. The transmitter source is coupled to a pair of mutually opposed transmitter plates Tx1, Tx2 to transmit the signal via a human body H. The apparatus further comprises a receiver Rx coupled to a pair of mutually opposed receiver plates Rx1, Rx2 to receive said transmission signal via said human body.

As illustrated in FIG. 3, the path loss is split into three stages:

Losses between the transmit tag and the inner body, defined herein by $\eta_1\eta_2=V_b/V_r$.

Losses of propagation in or along the body, or variations in field strength near the body caused by different properties (including body curvature, conductance, . . . ). This effect is small and is ignored in the current approach.

Attenuation in the path from the body to reader tag, defined herein by $\eta_1\eta_2=V_r/V_b$.

The reason for separately introducing $\eta_1$ and $\eta_2$ follows from the present interpretation of the circuit as two cascaded Wheatstone bridges. For each bridge, the voltage across the bridging impedance can be calculated by modeling each voltage divider, say of impedance $Z_A$ and $Z_B$ as a new voltage source with a reduced open output voltage $\eta_1=Z_A/(Z_A+Z_B)$. The internal source impedance equals the parallel impedance $Z_A\|Z_B=Z_A^{-1}+Z_B^{-1})^{-1}$ of the two impedances. The effect of internal impedances $Z_r$ in combination with the bridging impedance creates a second term $\eta_2$ in the attenuation.

IV. Transfer From Human to Receive Tag

We model the capacitances as follows: At the receiver, the capacitance of the nearest plate w.r.t. to human hand is $$C_4 = C_4^* + C_0 = \epsilon_0\left(\frac{\pi a_{RX}^2}{d_h} + \alpha a_{RX}\right) \quad (2)$$

Therein $d_h$ is the distance between the human hand and the first plate. The second plate is slightly farther out, at $d_h$ plus plate distance $d_{pRX}$, so $$C_3 = C_3^* + C_0 = \epsilon_0\left(\frac{\pi a_{RX}^2}{d_h + d_{pRX}} + \alpha a_{RX}\right) \quad (3)$$

For a reader high above the ground, it is accurate to approximate assume that the capacitance of one individual plate w.r.t. to earth is $$C_2 \cong C_1 \cong C_0 = \alpha\epsilon_0\alpha \quad (4)$$

A. Receiver with Infinite Input Impedance

For a high impedance front end ($R_r \to \infty$) and if the tag capacitance does not disturb the field, the (open) voltage difference $V_r$ between the two receiving plates can be obtained from $$\eta_1 = \left|\frac{V_r}{V_b}\right| = \left|\frac{Z_2}{Z_2+Z_4} - \frac{Z_1}{Z_1+Z_3}\right| \quad (5)$$

Filling in the capacitances $Z_i=1/j\omega C_i$, this can be rewritten as $$\eta_1 = \frac{|C_4 C_1 - C_3 C_2|}{(C_2+C_4)(C_1+C_3)} \quad (6)$$

Approximation the capacitances by the above-mentioned two-term approximation, this results in:

$$\eta_1 = \frac{|C_0 (C_4^* - C_3^*)|}{(2C_0+C_4^*)(2C_0+C_3^*)} \quad (7)$$

Subsequently, inserting the geometry of the capacitances gives $$\eta_1 = \frac{\alpha a_{RX}\left(\frac{\pi a_{RX}^2}{d_h} - \frac{\pi a_{RX}^2}{d_h+d_{pRX}}\right)}{\left(2\alpha a_{RX} + \frac{\pi a_{RX}^2}{d_h+d_{pRX}}\right)\left(2\alpha a_{RX} + \frac{\pi a_{RX}^2}{d_h}\right)} \quad (8)$$

B. Influence of Load Impedance of Receiver

In the above expression the effect of a load Zr also should be included. Essentially the receive transducer is a capacitor itself. If the voltage to the reader input is seen as being delivered via two voltage dividers, the inner resistance of the two dividers is:

$$Z_{eq} = Z_2 \| Z_4 + Z_1 \| Z_3$$

So an extra attenuation occurs of $$\eta_2 = \frac{Z_r}{Z_2 \| Z_4 + Z_1 \| Z_3 + Z_r}$$

That is, if the input impedance is dominated by the capacitance between the plates of the receive tag ($Z_r = 1/j\omega C_r$), $$\eta_2 = \frac{(C_2 + C_4)(C_1 + C_3)}{(C_1 + C_3)C_R + (C_2 + C_4)C_r + (C_2 + C_4)(C_1 + C_3)} \quad (9)$$

V. Transfer from Transmit ADA Tag to Human Body

This section addresses the communication from transmit tag to the body. The transfer from transmitter to the body resembles a Wheatstone bridge consisting of voltage dividers with output voltages $V_i(Z_6/(Z_8+Z_6))$ and $V_i(Z_5/(Z_7+Z_5))$ with impedance $Z_8\|Z_6$ and $Z_7\|Z_5$, resp. The load is $Z_b$.

$$I_u = \frac{\frac{Z_7}{Z_5+Z_7} - \frac{Z_6}{Z_8+Z_6}}{Z_8\|Z_6 + Z_7\|Z_5 + Z_b} V_i \quad (10)$$

So the path loss on the body can be written, after inserting capacitances, as $V_b = Z_b I_u = \eta_3 \eta_4 V_i$, where $$\eta_3 = \frac{C_5 C_6 - C_7 C_8}{(C_8+C_6)(C_5+C_7)} \quad (11)$$

$$\eta_4 = \left( \frac{C_b}{C_8+C_6} + \frac{C_b}{C_7+C_5} + 1 \right)^{-1} \quad (12)$$

A. Transferring a Signal onto the Body

Inserting $C_6 = C_8$ in the path loss expression leads to $$\eta_3 = \frac{(C_5 - C_7)}{2(C_5+C_7)} = \frac{(C_5^* - C_7^*)}{2(C_5^* + C_7^* + 2C_0)} \quad (13)$$

Next we insert geometries for the capacitors C5 and C7.

$$C_7^* = \frac{\pi \epsilon_0 a_{TX}^2}{d_b}$$

Here the implicit assumption is that the effective relevant area of the body is equal to the area of the TX plate. The second plate is slightly farther out, so $$C_5^* = \frac{\pi \epsilon_0 a_{TX}^2}{d_b + d_p}$$

The loss becomes, after mathematically simplifying the fractions, $$\eta_3 = \frac{d_{pTX}}{2\left(d_{pTX} + 2d_b + \frac{2\alpha}{\pi a_{TX}} d_b(d_b + d_{pTX})\right)} \quad (14)$$

B. Effect of Body Capacitance

Elaborating on $\eta_4$, we get $$\eta_4 = \frac{(C_8 + C_6)(C_7 + C_5)}{C_b(C_7 + C_5) + C_b(C_8 + C_6) + (C_8 + C_6)(C_7 + C_5)} \quad (15)$$

Moreover $C_6 = C_8$ yields $$\eta_4 = \frac{(C_7 + C_5)}{C_b \frac{C_7+C_5}{C_8+C_6} + C_b + (C_7 + C_5)} \quad (16)$$

Here $C_b$ is by far the largest capacitor $$\eta_4 = \frac{C_8 + C_6}{C_b} \frac{C_7 + C_5}{C_7 + C_5 + C_8 + C_6} \quad (17)$$

Figure 4:
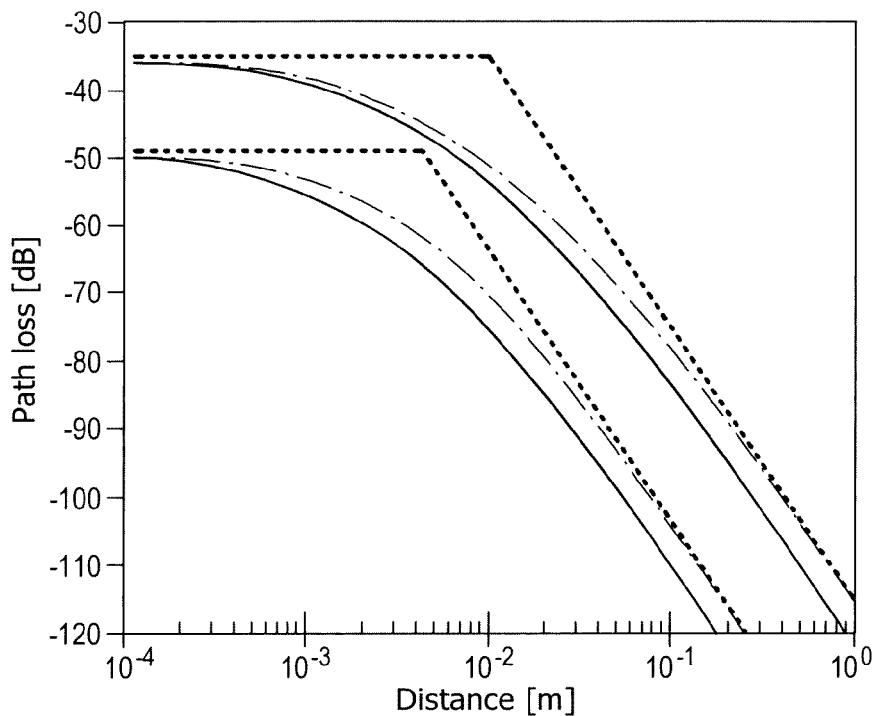
FIGS. 4 and 5 show numerical results.

As verified in FIG. 4, for $A_{TX} > d_p$ the following expression reflects the trend:

$$\eta_3 \eta_4 \cong \frac{1}{2} \frac{d_{pTX}}{2d_b + d_{pTX}} \frac{2\alpha \epsilon_0 a_{TX}}{C_b} \frac{\pi a_{TX}}{\pi a_{TX} + \alpha d_b} \quad (18)$$

VI. Total Path Loss

The total path loss can now be combined as $$\gamma = [\eta_1 \eta_2 \eta_3 \eta_4]^2$$

VII. Full Analysis of the Equivalent Circuit

The equivalent circuit model presented above was verified by comparison with a full analysis of the circuit based on a capacitance matrix method that models N+1 nodes where node 0 is the reference ground node. Capacitance $c_{k,n}$ is the capacitance that connects node n and k. $V_{k,0}$ is the voltage between node k and ground 0. We denote a (virtual) current feeding node k as $I_k$. Hence $$I_k = \Sigma_{n=1}^{N} j\omega c_{k,n}(V_{k,0} - V_{n,0}) \quad (19)$$

or, in matrix notation, the current matrix $I=[I_1, I_2, \ldots, I_n]^T$ is $$I = j\omega C V \qquad (20)$$

$$= j\omega \begin{bmatrix} c_{1,0}+c_{1,2}+\ldots+c_{1,N} & -c_{1,2} & & -c_{1,N} \\ -c_{1,2} & c_{2,0}+c_{2,1}+\ldots+c_{2,N} & \cdots & -c_{2,N} \\ \vdots & & \ddots & \vdots \\ -c_{1,N} & -c_{2,N} & \cdots & c_{N,0}+c_{N,1}+\ldots+c_{N,N-1} \end{bmatrix} \begin{bmatrix} V_{1,0} \\ V_{2,0} \\ \cdots \\ V_{N,0} \end{bmatrix}$$

If the BCC communication system is driven by a current $I_s$ fed from node $t_1$ to node $t_2$, thus with $I_s=[0, \ldots 0, I_s, 0, \ldots 0, -I_s, 0, \ldots 0]^T$ where the location of the non-zero entries have index $t_1$ and $t_2$, then the system must satisfy $$I_s = j\omega C V = j\omega \begin{bmatrix} \vdots & \vdots & \vdots & \vdots & \ldots \\ \ldots & C_{aa} & \ldots & C_{aa} & \ldots \\ \vdots & \vdots & \vdots & \vdots & \vdots \\ \ldots & C_{aa} & \ldots & C_{bb} & \ldots \\ \vdots & \vdots & \vdots & \vdots & \vdots \end{bmatrix} \begin{bmatrix} V_{1,0} \\ V_{2,0} \\ \cdots \\ V_{N,0} \end{bmatrix} \qquad (21)$$

The use of this capacitance matrix was proposed in [2] as a method to express the components in an equivalent electrical circuit. Our paper extends this mathematical method to express path loss between a transmit tag and a received tag. To this end we define the inverse $Z=C^{-1}$, such that $$V = \frac{1}{j\omega} Z I_s \qquad (22)$$

In a communication system, we express the transfer path loss as the square of the ratio of the received output voltages $V_r = V_{r1} - V_{r2}$ over the transmit input voltage $V_t = V_{t1} - V_{t2}$. According to ( ), the voltage on any node $a$ equals $$V_{a,0} = (Z_{a,t1} - Z_{a,t2}) \frac{I_s}{j\omega} \qquad (23)$$

A BCC system driven by a voltage source must also adhere to (21) and (22). The ratio of output over input voltages can be established from these expressions. As first recognized in the present application, the path loss in body coupled communication can be predicted as follows:

$$\gamma = \left[\frac{V_{r1,0} - V_{r2,0}}{V_{t1,0} - V_{t2,0}}\right]^2 = \left[\frac{Z_{r1,t1} - Z_{r1,t2} - Z_{r2,t1} + Z_{r2,t2}}{Z_{t1,t1} - Z_{t1,t2} - Z_{t2,t1} + Z_{t2,t2}}\right]^2 \qquad (24)$$

While this approach avoids the need for the evaluation of an equivalent circuit, the matrix inversion does not easily allow the derivation of asymptotic behaviors. Later sections will therefore further elaborate on a simplified circuit in order to explore trends and to propose and justify an approximate propagation model.

VIII. Asymptotic Behaviour Body→RX

A: Special Case of a Remote RX Tag

For receive tags relatively far from the body, thus with $d_h > a_{RX}$ and $d_h > d_p$, we can significantly simply this, particularly if in addition $a_{RX} >> d_p$. We see that the signal vanishes rapidly with $d_h$, since $$\eta_1 \to \frac{\pi}{4\alpha} \frac{\alpha_{RX} d_{pRX}}{d_h^2}$$

Moreover, $C_R >> C_4, C_3$ so $$\eta_2 \to \frac{C_3 + C_4}{C_R} = \frac{2\alpha d_p}{\pi a_{RX}} \qquad (25)$$

This gives $$\eta_1 \eta_2 \to \frac{\pi}{4\alpha} \frac{\alpha_{RX} d_{pRX}}{d_h^2} \frac{2\alpha d_p}{\pi a_{RX}} \to \frac{1}{2} \frac{d_{pRX}^2}{d_h^2} \qquad (26)$$

The rule of thumb that the slope acts as "40 log $d_h$" is confirmed by more accurate expressions, but the absolute height of the curves can be off by several dB because in practical BCC implementations the system works best with relatively large plate distances. Hence the approximation $a_{RX} >> d_p$ is not always realistic. In fact the above expression shows that for good reception preferably $d_p$ is large.

This indicates a decrease of the voltage with the square of the distance, so power decreases with distance to the fourth power. This quantifies the notion of body coupled communications. As the field rapidly reduces with distance, as $d_h^{-2}$ is much a faster decline than the $d_h^{-1}$ for free space radio communications.

B: Alternative Model Based on E-Fields Around a Body

For relatively large distances $d_h$, we may see the body as a point source for the electrical field, with capacitance $Q=C_b V_b$. According to Coulomb's law for interacting point charges, the contribution to the E-field at a point in space due to a single, discrete charge located at another point at distance $d_h$ is $$E = \frac{1}{4\pi\epsilon_0} \frac{Q}{d_h^2} \quad (27)$$

A capacitive detector tag with plate distance $d_p$ will see the voltage $$V = \frac{Q}{4\pi\epsilon_0} \frac{d_{pRX}}{d_h^2} = \frac{C}{4\pi\epsilon_0} \frac{d_{pRX}}{d_h^2} V_b \quad (28)$$

Inserting the expression for capacity of a sphere of radius $a_b$, $$V = \frac{Q}{4\pi\epsilon_0} \frac{d_{hp}}{d_h^2} = \frac{4\pi\epsilon_0 a_b}{4\pi\epsilon_0} \frac{d_p}{d_h^2} V_b = \frac{a_b d_{pRX}}{d_h^2} \quad (29)$$

This confirms the "40 log $d_h$" but only shows a linear effect of $d_p$, similar to $\eta_1$. However the above equation presumably underestimates the disturbing effect $\eta_2$ that the RX tag capacitance has on the E-field.

Nonetheless, in free space, thus without the presence of a human body, the BCC vanishes with "60 log $d_h$" if a receiver is separated distance $d_h$ from a transmitting capacitor. This can be seen from modeling a BCC transmitter as a dipole with field $$E_t \cong \frac{A}{2\pi d_h^3} V_{tx}$$

Therein A is the area of each of the plates of the ADA transmitter, and d is the distance between the transmitter and receiver.

The expressions in this paper however cover the E-filed from a body that acts as a mono-pole. Then the signal attenuates with "40 log $d_h$".

B. On-Body RX

In the extreme case that one of the receive plates is (almost) galvanically connected to the body, we may simplify $C_4 \to \infty$. Then $C_3$ coincides with the load capacitance $C_R$. $C_2$ is in parallel to the body and may be ignored ($C_b \gg C_2$). So the attenuation simplifies to a single voltage divider consisting of $C_3 \| C_R$ and $C_1$.

$$\eta_1 \eta_2 = \frac{\alpha d_{pRX}}{\pi a_{RX}} \frac{1}{2} \text{ Reciprocity}$$

The expressions and behavior at the TX and RX are NOT the same. That is, one must be careful with claiming reciprocity properties. In fact the electrical loading at the TX and RX are very different, which also violates conditions under which reciprocity holds.

IX. Asymptotic Behaviour TX→Body

A. Remote TX

For TX tags separated from the body $d_b > d_p$ we get $$\eta_3 = \frac{d_p \pi a_{TX}}{4\alpha d_b^2} \quad (30)$$

and $$\eta_3 \eta_4 = \frac{1}{2} \frac{\pi d_{pTX}}{d_b^2} \frac{\epsilon_0 a_{TX}^2}{C_b} \quad (31)$$

It can be seen that for large distances between the transmit tag and the body, also a "40 log dB" law applies.

B. On-Body TX

TX tags on the body $d_b < d_p$, a then, $\eta_3 \to \frac{1}{2}$ and $$\eta_3 \eta_4 = \frac{\alpha \epsilon_0 a_{TX}}{C_b} \quad (32)$$

Typical value $d_p = 1$ cm, and $C_b = 100$ pF. So using $\epsilon_0 \approx 8.9.0 \times 10^{-12}$ F·m$^{-1}$ we get $V_b/Vi = 0.09$ pF/100 pF (−60 dB). Hence most the signal strength is lost to couple the signal to the body, even if the TX tag is nearby. Plate size is an important factor.

X. Numerical Results

FIG. 4 describes the path loss from the transmitter to the body for plate sizes $a_{TX} = 1$ cm and 4 cm, for the lower and upper curve set, respectively. Furthermore, the distance between the receiver plates is $d_{pTX} = 5$ mm, and the body to ground capacitance is $C_b = 100$ pF. Plate radius $a_{TX} = 1$ cm and 4 cm.

The solid lines represent a full analysis of the capacitance matrix. These overlap perfectly with the + marks that represent the equivalent circuit model of two concatenated Wheatstone bridges. The (−.) line represents the trend expression and the dots (.) represent asymptotic expression. The trends predictions reflect the relative effects well, but the absolute height is off by several dBs, presumably because some assumptions on small plates distances relative to plate sizes are less accurate. The tag plates at $d_{pTX} = 5$ mm separated from each other, which leads to a well performing link, but challenges the approximations.

It can also be seen that the transition region between the two asymptotes is relatively large, and the important intermediate range where tag to body distance is in the order of 1 cm deserves a dedicated expression.

Figure 5:
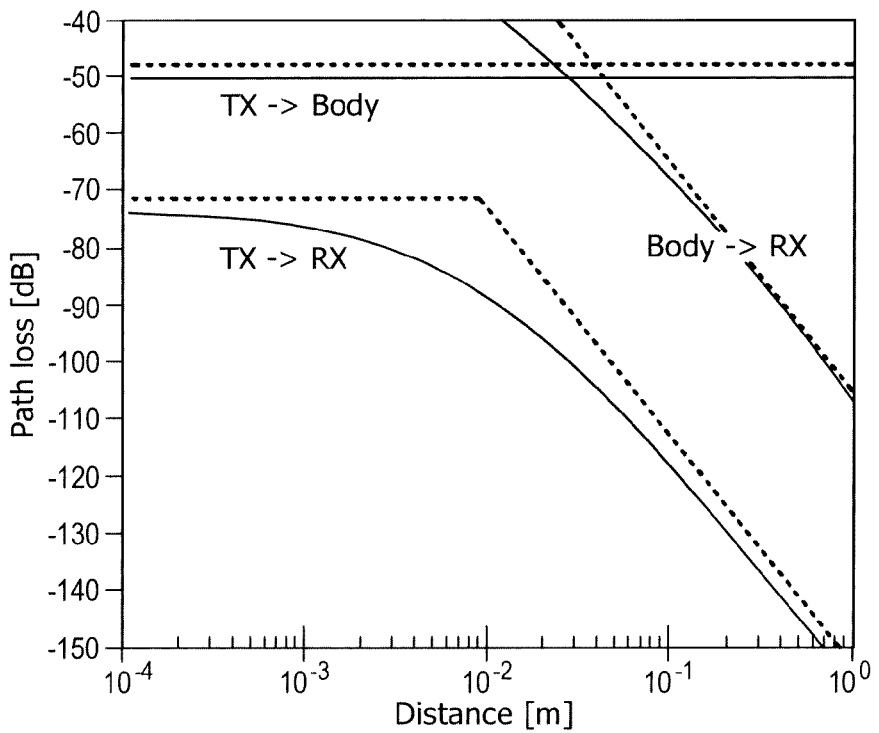

FIG. 5 shows the path loss (in dB) in various stages versus distance (in m) between body and receive tag. The solid line is calculated on the basis of a full matrix analysis, the crosses (X) show the result of the three stage model and the dots show the results obtained with the approximate expression. In these calculations it is assumed that circular plates with radius of 4 cm are used both at the transmitter TX and the receiver RX. Furthermore it is assumed that the distance between plates dPRX=dPTX=5 mm and that the transmission tag TX is 5 mm from the body.

FIG. 5 confirms the "40 log dh" behavior for the link from body to the receiver.

XI. Conclusions

The analysis presented above confirms that the body coupled channel can be interpreted as a communication link from a transmit tag onto the body. This induces a potential of the body with respect to ground. The body capacitance highly affects this link. Further a link from the charged body to the receiver tag occurs.

Signal strengths vanish with 40 log $d_h$ from the body. For transmit tags relatively close to body, it may also be assumed that the attenuation from TX tag to the body adheres to a 40 log $d_b$ behavior. The transmitter preferably uses plates of large size. The receiver preferably uses a large distance between the plates.

XII. Design Tool

Figure 6:
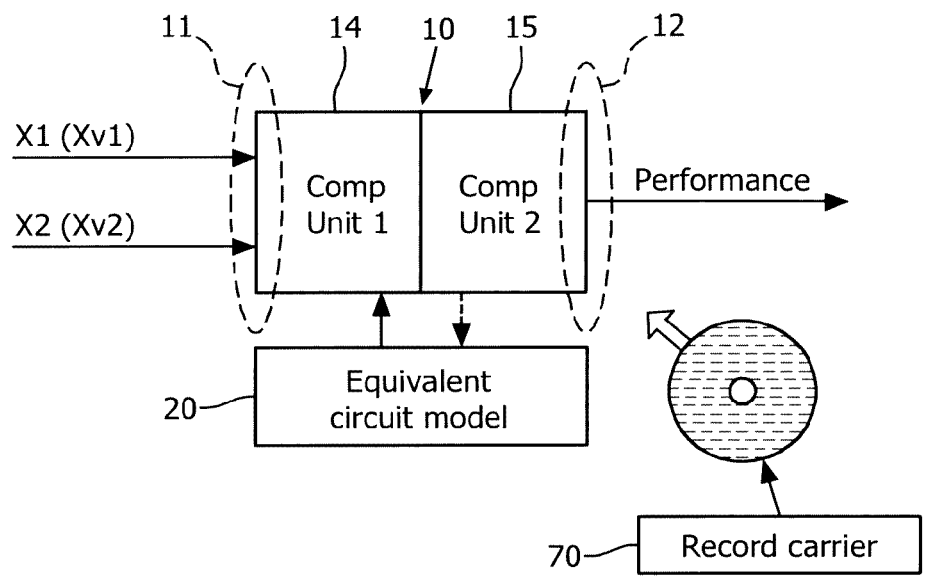
FIG. 6 shows a first embodiment of a design tool according to the first aspect of the invention.

FIG. 6 schematically shows a design tool according to the present invention that comprises a data input 11, a data output 12 and a computation engine 10 coupled to storage facility 20 comprising an equivalent circuit model. The design tool has the data input 11 to receive parameter values Xv1 for a set of parameters of a first type X1 and parameter values Xv2 for a set of parameters of a second type X2. Based on this input data the computation engine 10 calculate output data (Performance) indicative for a predicted performance and provides this data to its data output 12.

The set of parameters of a first type X1 specifies a propagation environment for the signal to be transmitted from the transmitter Tx to the receiver Rx and includes at least one of a distance between the human body H and the transmitter plates Tx1, Tx2, a distance between the human body H and the receiver plates Rx1, Rx2, and signal transmission properties of the human body H, e.g. a capacitance between the human body and ground.

The set of parameters of a second type X2 includes at least one design choice selected from a transmit voltage, a receiver sensitivity, dimensions of the transmission plates and their mutual distance, sizes of the receiver plates and their mutual distance.

The output data indicative for a predicted performance includes at least one of an expected attenuation of the transmission signal, a path loss, a link budget and a bit error rate.

The computation engine 10 comprises a first computation unit 14 to determine a capacitive transfer model from said signal source Tx, via the human body H to the signal receiver Rx. The computation engine 10 further comprises a second computation unit 15 to predict said performance using said capacitive transfer model.

In a first embodiment the first computation unit 14 determines a capacitive transfer model, schematically shown in FIG. 3. This capacitive transfer model comprises a first and a second capacitance C7, C5 specifying a respective capacitive coupling between each of the first and the second mutually opposed transmitter plates Tx1, Tx2 and the human body H. The capacitive transfer model further defines a third and a fourth capacitance C6, C8 specifying a respective capacitive coupling between each of the first and the second mutually opposed transmitter plates and ground GND. Further a fifth capacitance Cb therein specifies a capacitive coupling between the human body H and ground GND. Additionally a sixth and a seventh capacitance C4, C3 are included, specifying a capacitive coupling between each of the first and the second mutually opposed receiver plates Rx1, Rx2 and the human body, and an eight and a ninth capacitance C2, C1 are included specifying a capacitive coupling between each of the first and the second mutually opposed receiver plates and ground GND. A tenth capacitance Cr in the model specifies a mutual capacitive coupling between the mutually opposed receiver plates Rx1, Rx2. The capacitive values between capacitively coupled elements are approximated by $$C_i = C_i^* + C_0 = \frac{\pi \epsilon_0 a^2}{d} + \epsilon_0 \alpha a$$

as specified above with reference to equation 1 in part 1B.

In a second embodiment the first computation unit 14 includes a finite element computation module to generate a capacitance matrix approximating the capacitive transfer path from said signal source Tx, via the human body H to the signal receiver Rx. More details are provided in section VII above, in particular in equations 19-21.

In a third embodiment the second computation unit 15 includes a matrix inversion module to invert the capacitance matrix representative for the capacitive transfer model and uses this to predict the performance using the inverted capacitance matrix as described in more detail with reference to equations 22-24.

In a fourth embodiment, the second computation unit 15 may calculate the performance using the three stage approximation as described in more detail in sections III to VI.

A fifth embodiment includes a first computation unit 14 as described above for the first embodiment and a second computation unit 15 as described above for the third embodiment. In this fifth embodiment further a conversion module is present to convert the model obtained with the first computation unit 14 to a capacitance matrix to be used by the second computation unit 15.

A sixth embodiment includes a first computation unit 14 as described above for the second embodiment and a second computation unit 15 as described above for the fourth embodiment. In this sixth embodiment further a conversion module is present to convert the capacitance matrix obtained with the first computation unit 14 to the model to be used by the second computation unit 15.

During operation of the design tool a design method is performed. The design tool may at least partly be formed by a programmable processor. In that case further a computer program product 70 may be provided, comprising a computer program. When executed by the programmable processor the program causes the programmable processor to carry out any of the steps of the design method.

Figure 7:
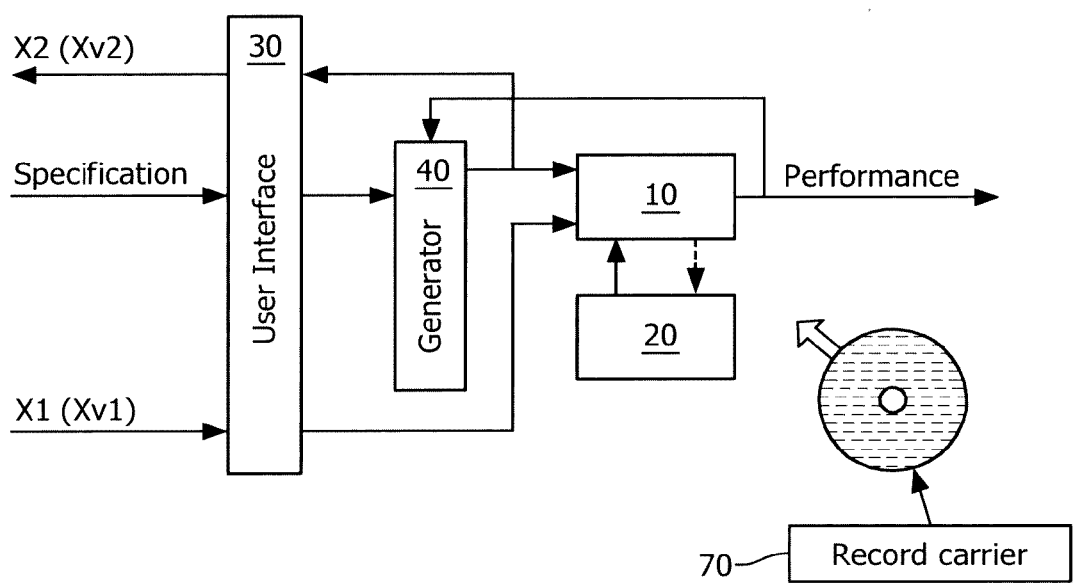
FIG. 7 shows a second embodiment of a design tool according to the first aspect of the invention.

FIG. 7. shows a more advanced design tool that in addition to the components described above with reference to FIG. 6 further includes a user interface 30 to enable a user to specify values Xv1 for the set of parameters of the first type X1. The user interface 30 also enables the user to provide a specification (Specification) for a required performance. The design tool further includes a generator 40 for generating values Xv2 for the set of parameters of the second type X2. The computation engine 10 predicts an actual performance (Performance) on the basis of the values X1v for the set of parameters of the first type X1 specified by the user and the values Xv2 for the set of parameters of the second type X2 generated by the generator 40. During operation the generator adapts the values Xv2 for the set of parameters of the second type X2 on the basis of said specified performance (Specification) and said actual performance (Performance) in order to achieve the specified performance. This can be realized by an iterative procedure. The user interface 30 provides the adapted values Xv2 of the set of parameters of the second type X2 to the user.

During operation of the design tool a design method is performed. The design tool may at least partly be formed by a programmable processor. In that case further a computer program product 70 may be provided, comprising a computer program. When executed by the programmable processor the program causes the programmable processor to carry out any of the steps of the design method, for example performing the required calculations, controlling the user interface etc.

XIII. BCC-Apparatus Embodiments

A. Embodiment 1

Figure 8:
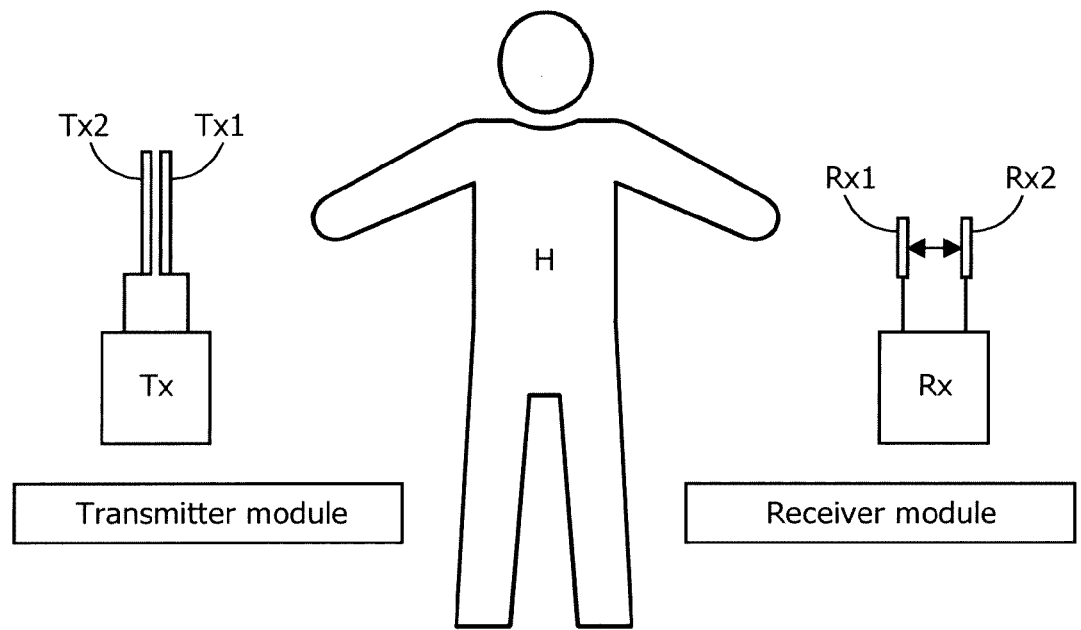
FIGS. 8, 8A, 8B show a first embodiment of a body coupled communication apparatus according to the third aspect of the invention.
Figures 8A, 8B:
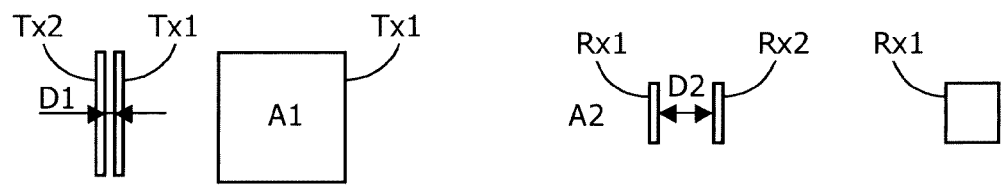

FIGS. 8, 8A and 8B show an embodiment of a body coupled communication apparatus according to the invention, comprising a transmitter module and a receiver module. Therein FIG. 8 shows an overview of the apparatus. The transmitter module includes a transmitter Tx having outputs coupled to a pair of mutually opposed transmitter plates Tx1, Tx2 to provide a transmission signal. The receiver module including receiver (Rx) coupled to a pair of mutually opposed receiver plates (Rx1, Rx2), to receive a reception signal, FIG. 8A shows a part of the transmitter module in more detail. Therein the left part of FIG. 8A shows a side view of the transmitter plates Tx1, Tx2 and the right part of FIG. 8A shows a top-view of plate Tx1. and a part of the receiver module in more detail. FIG. 8B shows a part of the receiver module in more detail. Likewise, the left part of FIG. 8B shows a side view of the receiver plates Rx1, Rx2 and the right part of FIG. 8B shows a top-view of plate Rx1. As can best be seen in FIG. 8A, the transmitter plates have a first area A1 and a first mutual distance D1. As can best be seen in FIG. 8B, the receiver plates have a second area A2 and a second mutual distance D2. In the apparatus according the present invention a ratio (A1*D2)/(A2*D1) is at least 2.

B. Embodiment 2

A second embodiment of an apparatus according to the present invention, described with reference to FIGS. 9, 9A, 9B and 9C. Therein, a transmitter module Tx, Tx1, Tx2 and a receiver module Rx, Rx1, Rx2 are integrated inside a common carrier CR together with a power supply PW. Therein FIG. 9 shows an overview. FIG. 9A shows a top-view of the carrier CR. FIG. 9B shows a cross-section according to IXBC-IXBC in a first variation and FIG. 9C shows a cross-section according to IXBC-IXBC in a second variation. The common carrier has a thickness of at most 15 mm and has a main surface with lateral dimensions of at most 10 cm. The pair of mutually opposed transmitter plates Tx1, Tx2 and said pair of mutually opposed receiver plates Rx1, Rx2 are arranged laterally besides each other. A main area A1 of the pair of transmitter plates is at least two times larger than a main area A2 of the pair of receiver plates.

In the embodiment shown in more detail in cross-section in FIG. 9B the receiver plates Rx1, Rx2 are aligned with the transmitter plates.

In the embodiment is shown in more detail in cross-section in FIG. 9C the pair of mutually opposed transmitter plates Tx1, Tx2 is aligned with the carrier surface and the pair of mutually opposed receiver plates Rx1, Rx2 is arranged transverse to said main surface at mutually opposite ends of the carrier CR.

This embodiment efficiently uses the available space in a handheld carrier CR. On the one hand the transmitter plates Tx1, Tx2 can have a relatively large surface area, e.g. up to close the total area of the handheld carrier CR and a relatively small mutual distance, in the order of magnitude of the thickness of the handheld carrier. On the other hand the receiver plates Rx1, Rx2 can have a relatively large mutual distance, i.e. in the order of magnitude of a lateral dimension of the carrier CR.

In one example, the handheld carrier is a mobile phone having lateral dimensions of 6×12 cm and a thickness of 1 cm. If the receiver plates Rx1, Rx2 are arranged each at mutually opposed long sides of the carrier CR, a ratio A1/A2 is equal to 6. Furthermore, the ratio (A1*D2)/(A2*D1) is equal to 36.

In an alternative arrangement of this embodiment, wherein the receiver plates Rx1, Rx2 are arranged each at mutually opposed short sides of the carrier CR, a ratio A1/A2 is equal to 12. Furthermore, the ratio (A1*D2)/(A2*D1) is equal to 144.

In another example, the handheld carrier CR is card shaped, e.g. having lateral dimensions of 54 mm×85 mm and a thickness of 1 mm comparable to those of a credit card. If the receiver plates Rx1, Rx2 are arranged each at mutually opposed long sides of the carrier CR, a ratio A1/A2 is equal to 54. Furthermore, the ratio (A1*D2)/(A2*D1) is equal to 2916.

In an alternative arrangement of this embodiment, wherein the receiver plates Rx1, Rx2 are arranged each at mutually opposed short sides of the carrier CR, a ratio A1/A2 is equal to 85. Furthermore, the ratio (A1*D2)/(A2*D1) is equal to 7225.

XIV. BCC-Receiver Embodiments

A. Embodiment 1

Figure 10:
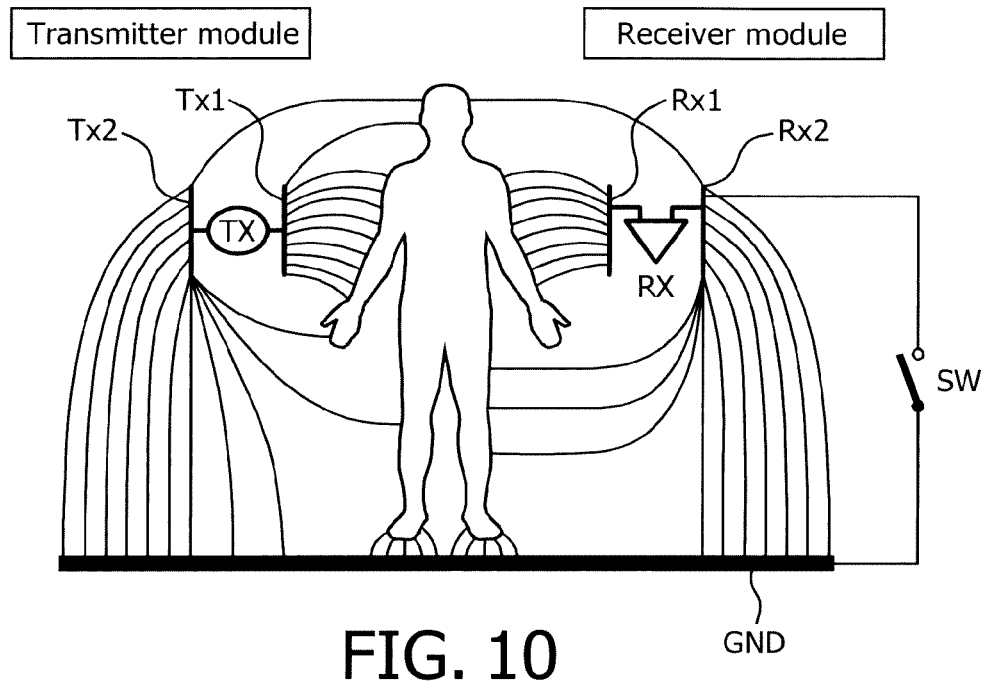
FIG. 10 shows a first embodiment of a receiver for a body coupled communication apparatus according to the fourth aspect of the present invention.

FIG. 10 shows a body coupled communication apparatus, having an inventive embodiment of receiver module. The receiver module includes a receiver RX having inputs coupled to a pair of receiver plates Rx1, Rx2 to receive a signal. One of the receiver plates (here Rx2) is coupled via a controllable switching element SW to ground GND. The receiver module has a first operational mode wherein the controllable switching element is in a closed state, i.e. conducting. In this operational mode receiver plate Rx2 is coupled to ground and the receiver module has a relatively large detection range. The receiver module has a second operational mode. Therein the controllable switching element SW1 is in an opened state, so that receiver plate Rx2 is decoupled from ground, like the other receiver plate Rx1. In that case the detection range is relatively small.

B. Embodiment 2

Figure 11:
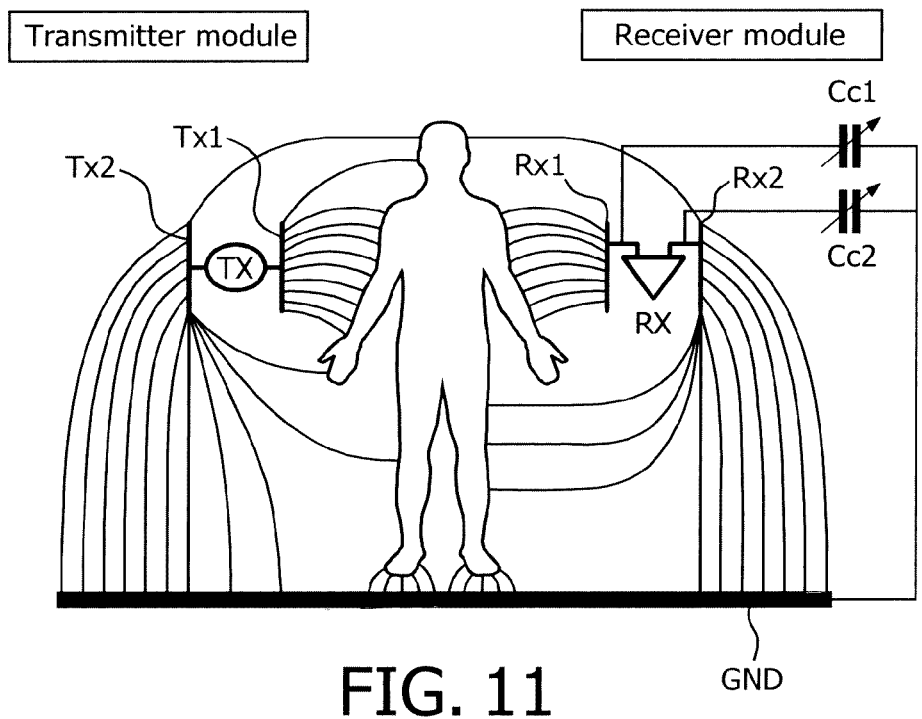
FIG. 11 shows a second embodiment of a receiver for a body coupled communication apparatus according to the fourth aspect of the present invention.

FIG. 11 shows a body coupled communication apparatus, having another inventive embodiment of receiver module. In this embodiment at least one of said receiver plates is coupled via a controllable capacitive element to ground GND. In this specific example each of the receiver plates Rx1, Rx2 is coupled via a controllable capacitive element Cc1, Cc2 to ground GND. The controllable capacitive elements Cc1, Cc2 can be tuned such that the total capacitive coupling between receiver plate Rx1 and ground GND equals the total capacitive coupling between receiver plate Rx2 and ground GND. In that case the receiver is optimally desensitized for long-range signals. If it is beforehand clear that one of the receiver plates has a lower parasitic capacitance to ground than the other one than it is sufficient that only a single controllable capacitive element is used, which is coupled to the one of the plates having the lower parasitic capacitance to ground. The optimal value for the controllable capacitive element(s) may be tuned by transmitting a signal at a position remote from the receiver and tuning the controllable capacitive element(s) to a value for which the received signal is minimized. The embodiment of FIG. 11 may be combined with the embodiment of FIG. 10. In that case a controllable switching element SW as shown in FIG. 10 is coupled between for example receiver plate Rx2 and ground GND.

Although embodiments of the present invention have been illustrated in the accompanying drawings and described in the foregoing detailed description, it will be understood that the invention is not limited to the embodiment disclosed, but is capable of numerous modifications without departing from the scope of the invention as set out in the following claims.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. A 'Computer program product', e.g. a computer readable medium, is to be understood to mean any software product stored on a computer-readable medium, such as a floppy disk, downloadable via a network, such as the Internet, or marketable in any other manner.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

The invention claimed is:

1. A computer-implemented design tool for designing a body coupled communication apparatus, comprising:
a transmitter to generate a transmission signal and coupled to a pair of mutually opposed transmitter plates to transmit the signal via a human body;
a receiver coupled to a pair of mutually opposed receiver plates to receive the transmission signal via said human body;
a data input to receive parameter values for a set of parameters of a first type and parameter values for a set of parameters of a second type;
a data output; and
a computation engine to calculate output data and to provide the output data indicative for a predicted performance to the data output, wherein the set of parameters of a first type specify a propagation environment for the signal to be transmitted from the transmitter to the receiver, including at least one of a distance between the human body and the transmitter plates, a distance between the human body and the receiver plates, and signal transmission properties of the human body, wherein the set of parameters of a second type includes at least one design choice relating to one or more of a transmit voltage, a receiver sensitivity, dimensions of the transmission plates, a first area (A1) of the transmission plates and their mutual distance (D1), sizes of the receiver plates, a second area (A2) of the receiver plates and their mutual distance (D2), and wherein the output data indicative for a predicted performance includes at least one of an expected attenuation of the transmission signal, a path loss, a link budget and a bit error rate, wherein the computation engine comprises a first computation unit to determine a capacitive transfer model from the transmitter via the human body to the receiver, and a second computation unit to predict the performance using the capacitive transfer model, wherein the at least one design choice specifies that a ratio (A1*D2)/(A2*D1) is at least 2.

2. The computer-implemented design tool according to claim 1, wherein the first computation unit determines the capacitive transfer model as a first and a second capacitance specifying a respective capacitive coupling between a first and a second one of the mutually opposed transmitter plates and the human body and further defining a third and a fourth capacitance specifying a respective capacitive coupling between the first and second one of the mutually opposed transmitter plates and ground, a fifth capacitance specifying a capacitive coupling between the human body and ground, a sixth and a seventh capacitance specifying a respective capacitive coupling between a first and a second one of the mutually opposed receiver plates and the human body, and an eight and a ninth capacitance specifying a respective capacitive coupling between the first and second one of the mutually opposed receiver plates and ground, and further a tenth capacitance specifying a mutual capacitive coupling between the mutually opposed receiver plates.

3. The computer-implemented design tool according to claim 2, wherein capacitances between capacitively coupled elements are approximated by $$C_i = C_i^* + C_0 = \frac{\pi \epsilon_0 a^2}{d} + \epsilon_0 \alpha a$$

wherein the first term ($C^*_i$) is a short-range contribution and the second term ($C_o$) is a long-range contribution, $\epsilon_0$ is the electrical permittivity (8.85×10$^{-12}$ F/m), wherein a and d respectively are a representative dimension of the capacitively coupled elements and a representative distance between the capacitively elements, and wherein a is a form factor in the range of 3 to 4.

4. The design tool according to claim 1, wherein the first computation unit includes a finite element computation module to generate a capacitance matrix approximating the capacitive transfer path from the transmitter via the human body to the receiver.

5. The design tool according to claim 4, wherein the second computation unit includes a conversion module and a Wheatstone computation module, wherein the conversion module converts the capacitance matrix obtained from the finite element computation module into an approximate circuit model approximating the capacitive transfer path from the transmitter via the human body to the receiver by a first and a second capacitive Wheatstone bridge, wherein the first capacitive Wheatstone bridge includes a first and a second capacitance specifying the respective capacitive coupling between the first and a second one of the mutually opposed transmitter plates and the human body and a third and a fourth capacitance specifying the respective capacitive coupling between the first and the second one of the mutually opposed transmitter plates and ground, and wherein the second capacitive Wheatstone bridge includes a sixth and a seventh capacitance specifying the respective capacitive coupling between the first and the second one of the mutually opposed receiver plates and the human body, and an eight and a ninth capacitance specifying the respective capacitive coupling between the first and the second one of the mutually opposed receiver plates and ground, the approximation further including the fifth capacitance specifying the capacitive coupling between the human body and ground, as well as a tenth capacitance specifying a mutual capacitive coupling between the mutually opposed receiver plates (Rx1, Rx2), and wherein the second computation unit includes the Wheatstone computation module to predict the performance on the basis of the approximate circuit model.

6. The design tool according to claim 1, wherein the second computation unit includes a matrix inversion module to invert a capacitance matrix representative for the capacitive transfer model and to predict the performance using the inverted capacitance matrix.

7. The design tool according to claim 1, wherein the second computation unit comprises a Wheatstone computation module to predict the performance on the basis of the approximation of the capacitive transfer path from the transmitter via the human body to the receiver by a first and a second capacitive Wheatstone bridge, wherein the first capacitive Wheatstone bridge includes the first and the second capacitance specifying the respective capacitive coupling between the first and a second one of the mutually opposed transmitter plates and the human body and the third and the fourth capacitance specifying the respective capacitive coupling between the first and the second one of the mutually opposed transmitter plates and ground, and wherein the second capacitive Wheatstone bridge includes the sixth and the seventh capacitance specifying the respective capacitive coupling between the first and the second one of the mutually opposed receiver plates and the human body, and the eight and the ninth capacitance specifying the respective capacitive coupling between the first and the second one of the mutually opposed receiver plates and ground, the approximation further including the fifth capacitance specifying the capacitive coupling between the human body and ground and further a tenth capacitance specifying a mutual capacitive coupling between the mutually opposed receiver plates.

8. The design tool according to claim 1, further including a user interface to enable a user to specify values for the set of parameters of the first type, and to provide a specification for a required performance, the design tool further including a generator for generating values for the set of parameters of the second type, wherein the computation engine predicts an actual performance on the basis of the values for the set of parameters of the first type specified by the user and the values for the set of parameters of the second type generated by the generator, wherein the generator is configured for adapting the values for the set of parameters of the second type on the basis of the specified performance and the actual performance in order to achieve the specified performance and wherein the user interface is further configured for providing the adapted values of the set of parameters of the second type to the user.

9. A method for designing a body coupled communication apparatus, comprising:
receiving a transmission signal by a transmitter coupled to a pair of mutually opposed transmitter plates to transmit the signal via a human body;
receiving the transmission signal, via the human body, by a receiver coupled to a pair of mutually opposed receiver plates;
receiving parameter values for a set of parameters of a first type and parameter values for a set of parameters of a second type;
calculating output data; and
providing the output data indicative for a predicted performance to a data output, wherein the set of parameters of the first type specify a propagation environment for the signal to be transmitted from the transmitter to the receiver including at least one of a distance between the human body and the transmitter plates, a distance between the human body and the receiver plates, and signal transmission properties of the human body, wherein the set of parameters of the second type includes at least one design choice relating to one or more of a transmit voltage, a receiver sensitivity, dimensions of the transmission plates, a first area (A1) of the transmission plates and their mutual distance (D1), sizes of the receiver plates, an area (A2) of the receiver plates and their mutual distance (D2), and wherein the output data indicative for a predicted performance includes at least one of an expected attenuation of the transmission signal, a path loss, a link budget and a bit error rate, wherein the calculating comprises determining a capacitive transfer model from the transmitter via the human body to the receiver, and predicting the performance using the capacitive transfer model, wherein the at least one design choice specifies that a ratio (A1*D2)/(A2*D1) is at least 2.

10. The method according to claim 9, further comprising:
enabling a user to specify values for said set of parameters of the first type and to provide a specification for a required performance;
generating values for the set of parameters of the second type;
predicting an actual performance on the basis of the values for the set of parameters of the first type specified by the user and the generated values for the set of parameters of the second type;
adapting the values for the set of parameters of the second type on the basis of the specified performance and the actual performance in order to achieve the specified performance; and
providing the adapted values of the set of parameters of the second type to the user.

11. A non-transitory computer-readable medium having one or more executable instructions stored thereon, which when executed by a processor, cause the processor to perform a method for designing a body coupled communication apparatus, the method comprising:
generating a transmission signal by a transmitter coupled to a pair of mutually opposed transmitter plates to transmit the signal via a human body;
receiving the transmission signal, via the human body, by a receiver coupled to a pair of mutually opposed receiver plates;

receiving parameter values for a set of parameters of a first type and parameter values for a set of parameters of a second type;

calculating output data; and providing the output data indicative for a predicted performance to a data output, wherein the set of parameters of the first type specify a propagation environment for the signal to be transmitted from the transmitter to the receiver including at least one of a distance between the human body and the transmitter plates, a distance between the human body and the receiver plates, and signal transmission properties of the human body, wherein the set of parameters of the second type includes at least one design choice relating to one or more of a transmit voltage, a receiver sensitivity, dimensions of the transmission plates, a first area (A1) of the transmission plates and their mutual distance (D1), sizes of the receiver plates, an area (A2) of the receiver plates and their mutual distance (D2), and wherein the output data indicative for a predicted performance includes at least one of an expected attenuation of the transmission signal, a path loss, a link budget and a bit error rate, wherein the calculating comprises determining a capacitive transfer model from the transmitter via the human body to the receiver, and predicting the performance using the capacitive transfer model, wherein the at least one design choice specifies that a ratio (A1*D2)/(A2*D1) is at least 2.

* * * * *